US007203657B1

(12) United States Patent
Noam

(10) Patent No.: US 7,203,657 B1
(45) Date of Patent: Apr. 10, 2007

(54) GENERAL PACKET-BASED PAYMENT AND TRANSACTION METHOD AND SYSTEM

(76) Inventor: Eli M. Noam, 450 Riverside Dr., #51, New York, NY (US) 10027

(*) Notice: Subject to any disclaimer, the term of this patent is extended or adjusted under 35 U.S.C. 154(b) by 481 days.

(21) Appl. No.: 09/655,520

(22) Filed: Sep. 5, 2000

(51) Int. Cl.
*G06Q 30/00* (2006.01)
(52) U.S. Cl. .............................. 705/26; 705/1; 705/39; 705/41; 705/69; 713/175; 713/189; 707/102; 707/103 R; 707/200; 235/375; 235/379; 235/380; 380/44; 380/46
(58) Field of Classification Search ................ 705/39, 705/41, 64, 1, 26; 235/399, 375–380, 492; 713/175, 189; 380/44, 46; 707/102, 103 R, 707/200
See application file for complete search history.

(56) References Cited

U.S. PATENT DOCUMENTS

| 4,727,487 | A | | 2/1988 | Masui et al. .................. 706/57 |
|---|---|---|---|---|
| 5,450,570 | A | | 9/1995 | Richek et al. ............... 395/500 |
| 5,487,168 | A | | 1/1996 | Geiner et al. .................. 705/8 |
| 5,557,518 | A | * | 9/1996 | Rosen .......................... 705/69 |
| 5,640,569 | A | | 6/1997 | Miller et al. ................. 710/241 |
| 5,771,289 | A | | 6/1998 | Kuzma ......................... 380/23 |
| 5,854,581 | A | * | 12/1998 | Mori et al. .................. 235/379 |
| H001794 | H | * | 4/1999 | Claus .......................... 235/380 |
| 5,913,203 | A | * | 6/1999 | Wong et al. ................... 705/39 |
| 5,930,777 | A | | 7/1999 | Barber ......................... 705/40 |
| 5,952,639 | A | * | 9/1999 | Ohki et al. .................. 235/379 |
| 5,999,919 | A | | 12/1999 | Jarecki et al. ................ 705/39 |
| 6,029,150 | A | | 2/2000 | Kravitz ........................ 705/40 |
| 6,029,151 | A | * | 2/2000 | Nikander ...................... 705/39 |
| 6,047,269 | A | * | 4/2000 | Biffar .......................... 705/39 |
| 6,061,665 | A | | 5/2000 | Bahreman .................... 705/40 |
| 6,072,870 | A | | 6/2000 | Nguyen et al. ............... 380/24 |
| 6,078,906 | A | | 6/2000 | Huberman .................... 705/37 |
| 6,088,687 | A | | 7/2000 | Leleu ......................... 705/400 |
| 6,119,946 | A | * | 9/2000 | Teicher ....................... 235/492 |
| 6,338,048 | B1 | * | 1/2002 | Mori ........................... 705/41 |
| 6,467,685 | B1 | * | 10/2002 | Teicher ....................... 235/379 |
| 7,107,236 | B2 | * | 9/2006 | Lei ............................. 705/27 |
| 2001/0051920 | A1 | * | 12/2001 | Joao et al. .................... 705/41 |
| 2003/0061170 | A1 | * | 3/2003 | Uzo ............................ 705/64 |

OTHER PUBLICATIONS 7.2. Sheehan, Kevin P., "Electronic Cash", FDIC Banking Review, □□Washington 1998, vol. 11, ISS.2, pp. 1-8, extracted from Internet web site http://proquest.umi.com on Jun. 25, 2000.*

(Continued)

*Primary Examiner*—Yogesh C. Garg

(57) ABSTRACT

A method and system to enable data packets to engage in two-way transactions with various facilities, electronic equipment, and data sources, performing various services. This is accomplished by the loading of data packets with access tokens, denominated at certain values and issued by certain institutions. These tokens are then transferred, according to the instructions of a packet controller that is part of a packet, and according to the interaction of packet controller and facility gateway access controller, from packets to facilities (or vice versa) that provide services, and are redeemed by the facility or the source of the packet. This system enables information, communication, and general commercial activities by establishing a generalized mechanism for payment, transactions, negotiation, and differentiation on the packet level.

5 Claims, 2 Drawing Sheets

OTHER PUBLICATIONS

Talmor, Sharon; " A chip off the old stripe"; The Banker, London; Oct. 1994, pp. 1-4; extracted from Internet web site http://proquest.umi.com on Jun. 25, 2003.*

E. Chi 1997 Evaluation of Micropayment Schemes.

N. Ferguson 1993 Single Term Off-Line Coins.

N. Hardy, E.D. Tribble 1993 The Digital Silk Road.

E. Noam 1995 Taking the Next Step Beyond Spectrum Auctions: etc.

E. Noam 1998 Spectrum Auctions Yesterday's Heresey, Today's orthodoxy, etc.

J. Kyotojoki, V. Karpijoki 2000 Micropayments—Requirements and Solutions.

C. Schmidt, R. Múller 1997 a Framework for Micropayment Schemes.

* cited by examiner

SCHEMATIC DIAGRAM OF TRANSACTIONAL DATA PACKET

FLOW DIAGRAM FOR ACCESS TOKENS

GENERAL PACKET-BASED PAYMENT AND TRANSACTION METHOD AND SYSTEM

CROSS-REFERENCE TO RELATED APPLICATIONS

Not applicable

BACKGROUND

1. Field of Invention

This invention relates to the process of payments by and to streams of information for passage and transactions in computers, networks, and other electronic devices.

2. Overview

More units of electronic information are being produced, moved, processed, stored, accessed, and sold than ever before. Information flows are being handled by numerous transmission carriers, storage providers, processors, and content vendors, most of them operated by commercial entities. The information flows reach and interact with numerous devices. It is difficult for network firms and service and information providers to charge for their services, and for users and suppliers to monitor and control the numerous transactions that are required in moving, processing, buying, and selling of information A few examples follow for the emerging complex system for informational transactions.

Storage networks—Unrelated users optimize storage utilization by linking hard drives and other storage devices.

Processing Networks—Computer users utilize the processing capacity of other unrelated computers.

Web Interaction—Websites are communicating and transacting with each other directly, without the human intervention of clicking etc.

Processor and sensor interaction—Transactions are moving from direct human control to those of delegated devices dealing with each other. For example, automobiles will be communicating directly with highways, air conditioners with utilities, etc.

Transmission Interaction—Information travels across transmission networks of various carriers, and various transmission media, depending on the rapidly shifting availability of capacity and price. The data packets comprising a single message could travel across different networks, and be passed on from network to network.

Information Trade—Much economic activity is taking place in buying, selling, and accessing information. Some information is sought by the user, for business or entertainment purposes. In other cases, the information is pushed to users and requires their attention and resources.

Priority Assignment Different streams of information require different priority in transmission, processing, etc.

Intelligent Agents and Software Robots. Software programs are being sent out by users to access data bases operated by other entities, to find information, and to bring it to the user.

As these examples show, the complexity and number of transactions involving information is growing, and many of them are outside of direct control and monitoring by humans or centralized machines. Too much of attention, transmission and processing capacity would be used up by each piece of information having to be controlled from the distance, report back, receive instructions, account for itself, etc.

With the increasing complexity of the information environment, it becomes necessary to create a method that would permit to conduct a numerous transactions in information and related goods and services quickly, under rapidly changing circumstances, and involving numerous parties, many of which do not know each other. Without such a transaction and payment mechanism many services would either not be provided or be inefficient in their provision. A way to engage in such transactions is to conduct them on the level of the information itself, to integrate the information with the transaction itself. And since information is increasingly moved and handled in the form of a set of binary information—"data packets"—this means that the transaction mechanism would be placed at the packet level itself.

To draw an analogy: the traditional method of informational transactions was like that for a freight train: the train moving across well-defined and pre-arranged paths, involving arrangements among a few firms, and with payments invoiced by a bulk bill. These kinds of arrangements are likely to remain for certain types of information flows, such as the distribution of live, mass audience video programming over cable television networks. In contrast, what is increasingly needed for information resembles a system of private vans, whose trained drivers pick their route with continuing reference to congestion (this is analogous to conventional packet switched communication), pay tolls and parking fees from their own wallet, find the cheapest route, buy gasoline, negotiate with the customer for payment for both delivery fees and merchandise, collect payments upon delivery, and deposit these payments at a bank.

3. Discussion of Prior Art

There is very little direct literature or patents that could be identified, though there are several related strands of related prior art.

1. General Systems of Electronic Money and Micro-Payments. E-Money schemes create secure ways to transfer and store money electronically, and to pay electronically for transactions. To deal with smaller transactions, a variety of micro-payment schemes have been proposed and patented. Because the amounts in question can be non-trivial, the encryption used in order to assure security tends to be fairly strong, and there is usually an element of human intervention in authorizing and specifying the transaction, or at least to control and monitor the transaction from a distance. These systems aim to create electronic money for an entire transaction, such as for accessing a song, reading an electronic magazine, or securing and relatively anonymous cash-like payment from pre-paid cards and similar devices. These schemes do not operate on the packet level, and do not assign information packets with the means and the ability to transact directly.

These patents include:
U.S. Pat. No. 5,930,777 to Barber, 1999, Methods of charging for pay-per-access information over a network
U.S. Pat. No. 5,999,919 to Jarcki and Odlyzko, 1999, Efficient micropayment system
U.S. Ser. No. 06/029,150 to Kravitz, 2000, Payment and transactions in electronic commerce system
U.S. Ser. No. 06/072,870 to Nguyen, Haller and Kramer (2000) System, method and article of manufacture for a gateway payment architecture utilizing a multichannel, extensible, flexible architecture
U.S. Ser. No. 06/061,665 to Bahreman (2000) System, method and article of manufacture for a dynamic negotiation of a network payment framework Literature references:
Chi, Ellis. *Evaluation of Micropayment Schemes.*
http://www.hpl.hp.com/techreportws/97/HPL-97-14.html, January 1997

Ferguson, Niels, "Single Term Off-Line Coins," *Proceedings of EuroCrypt '93*, ftp.cwi.nl/pub/CWIreports/AA/CS-R9318.ps.Z, 1993

Kytpoki, Jari and Kapijoki. Vesa. *Micropayments—Requirements and Solutions*.http://www.hut.fi/~vkarpijo/netsec99/, January 2000.

Schmidt Carsten and Rudolf Müller, *A Framework for Micropayment Evaluation*, Netnomics 1 No. 2, 1999. pp. 187–200

2. Allocation of Computing Capacity. A variety of proposals have been made for the allocation of scarce processing capacity, some with an economic dimension of payments or auction. Here, too, is the transaction for the processing capacity handled separately from the information that is to be processed.

Examples for such patents are:

U.S. Pat. No. 4,727,487 February 1988 to Matsui et al, Hitachi, Resource allocation method in a computer system U.S. Pat. No. 5,487,168 January 1996 to Geiner et al. International Business Machines Corporation, Method and system for global optimization of device allocation U.S. Pat. No. 5,640,569: to Miller et al, Sun Microsystems, June 1997, Diverse goods arbitration system and method for allocating resources in a distributed computer system U.S. Pat. No. 6,078,906, to Huberman, Xerox, June 2000, Method and system for providing a document service over a computer network using an automated brokered auction U.S. Pat. No. 5,450,570: to Richek et al, Compaq, September 1995, Computer implemented method and apparatus for dynamic configuration of a computer system and circuit boards including computer resource allocation conflict resolution 3. Payment for Packet Switching.

Increasingly, digital information streams are being separated, for purposes of transmission over data networks, and for accessing computers and other devices, into a series of units known as data packets. Several protocols for packets exist. Traditionally each packet consists of a "payload" (the actual information to be transmitted) as well as an "overhead" that includes the address of the destination, as well as information about the source (the sender). More recently, the proposed protocol for the next-generation Internet protocol IPv6 includes a field in the packet to list the priority level. One recent patent could be identified for a payment mechanism for packet networks. It is for payments for transmission only, by a subtraction from a prepaid storage card. It does not provide for payments to other types of information transaction, or for payments to a packet rather than from a packet. It does not include the packet intelligence needed for engaging in transactions based on decision rules. And it has no provision for a differentiated treatment of packets. Thus, it is limited to toll payments for packet switched networks, and does not provide a general transaction mechanism for information.

U.S. Pat. No. 6,088,687 to Leleu, July 2000, Billing procedure and system for data transmission networks An earlier patent provides for a still more limited payment system, of digital postage stamps attached to entire messages such as e-mail letters.

U.S. Pat. No. 5,771,289: to Kuzma, June 1998, Method and apparatus for transmitting electronic data using attached electronic credits to pay for the transmission.

One article was identified that discussed mechanisms of counting packets and settling among several partners. (Hardy and Tribble, 1995). That essay suggests, among several other issues, that any pair of adjoining carriers or other sites can transact with each other by establishing counters (accumulators) for packets traversing between their two adjoining sites, and a settlement system based on it among these neighboring sites. Somewhat contradictorily to this settlement system of sites with each other, there is also a provision for payment by a value card that is part of the information that gets routed. This system requires some preexisting limited trust relationship among the parties, and hence the number of participants with which any party can deal with is limited. Furthermore, the mechanism in question is not generalized for transactions of all kinds. It is used only for payment by the information, i.e., it is a one-way transfer. And it does not provide the packets with a means of intelligence to conduct transaction according to certain decision rules.

Hardy, Norman and Tribble, Eric Dean "The Digital Silk Road." In Tulloh, William, Mark Miller, and Don Lavoie, eds. *Agoric Systems: Market Based Computation*, September 1995.

4. Intelligent Agents. No patents could be identified for intelligent agent software programs that are also capable of payment for access, transmission, processing, or which carry means of payment for transactions they engage in.

5. By the Applicant. Noam, the applicant, in related papers, (1995, 1998) dealing with governmental spectrum policy, discussed the use of token-based access to the frequency spectrum, as an alternative to licensing requirements. That proposal was limited to wireless spectrum, using tokens issued by local clearinghouses of users, and did not include transaction intelligence, a two-way capability, or a generalizable transaction capability. Noam's papers did, however, spark his further thinking, and led to two unpublished talks about economic and policy implications of the integration of information and money, given in March and July, 2000. This then led to the development of the present invention.

Noam, Eli. "Taking the Next Step Beyond Spectrum Auctions: Open Spectrum Access." *IEEE Communications Magazine*, December 1995, pp. 66–73.

Noam, Eli. "Spectrum Auctions: Yesterdays Heresy, Today's Orthodoxy, Tomorrow's Anachronism." *Journal of Law and Economics*, December 1998. pp. 765–790.

OBJECTS AND ADVANTAGES

Several objects and advantages of my invention are:

(a) to provide a system and method for the payment, without central control, for the transmission, processing, storage, and other transactions relating to information, and of access to information, and for any other transaction by electronic means.

(b) To provide a system and method by which information, intelligent agent software programs, and payment tokens are collocated, moving together across networks and devices.

(c) To provide an intelligence in the information itself, thereby making it capable of transactional decisions for many purposes. To make such a system compatible with numerous applications, transactions, and users, thus establishing a general payment mechanism for electronic activities.

(d) Further objects and advantages of the invention will become apparent from a consideration of its description.

SUMMARY

A decentralized system of nano-transactions for information applications and other commercial transactions including access, processing, storage, transmission, purchases, and sales, and capable of differential treatment of packets and of two-way transactions.

DESCRIPTION OF INVENTION

Figure 1:
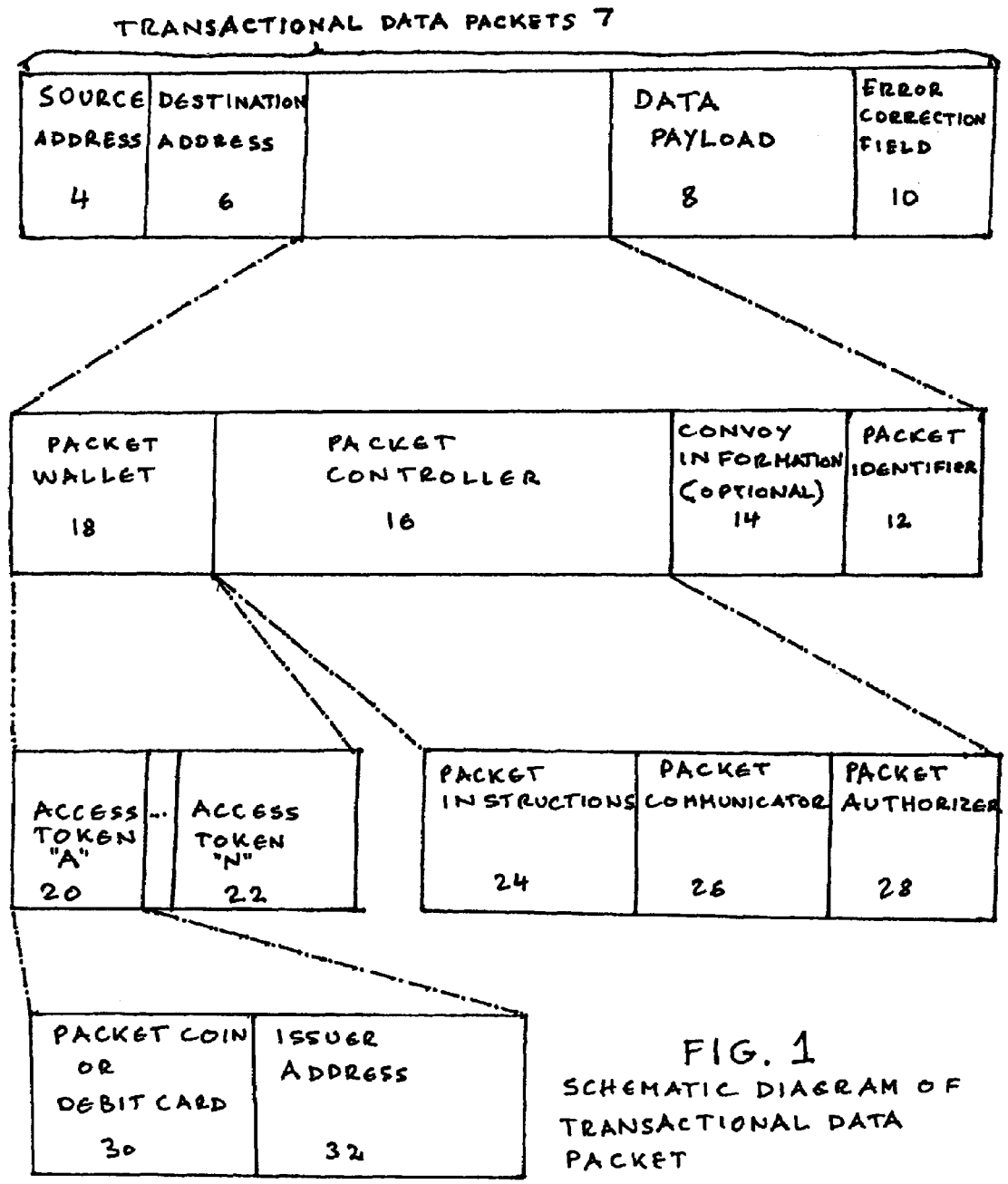
FIG. 1 is a schematic diagram of a transactional data packet, illustrating the collocation, on a packet, of means of payment, transactional intelligence, and information.
Figure 2:
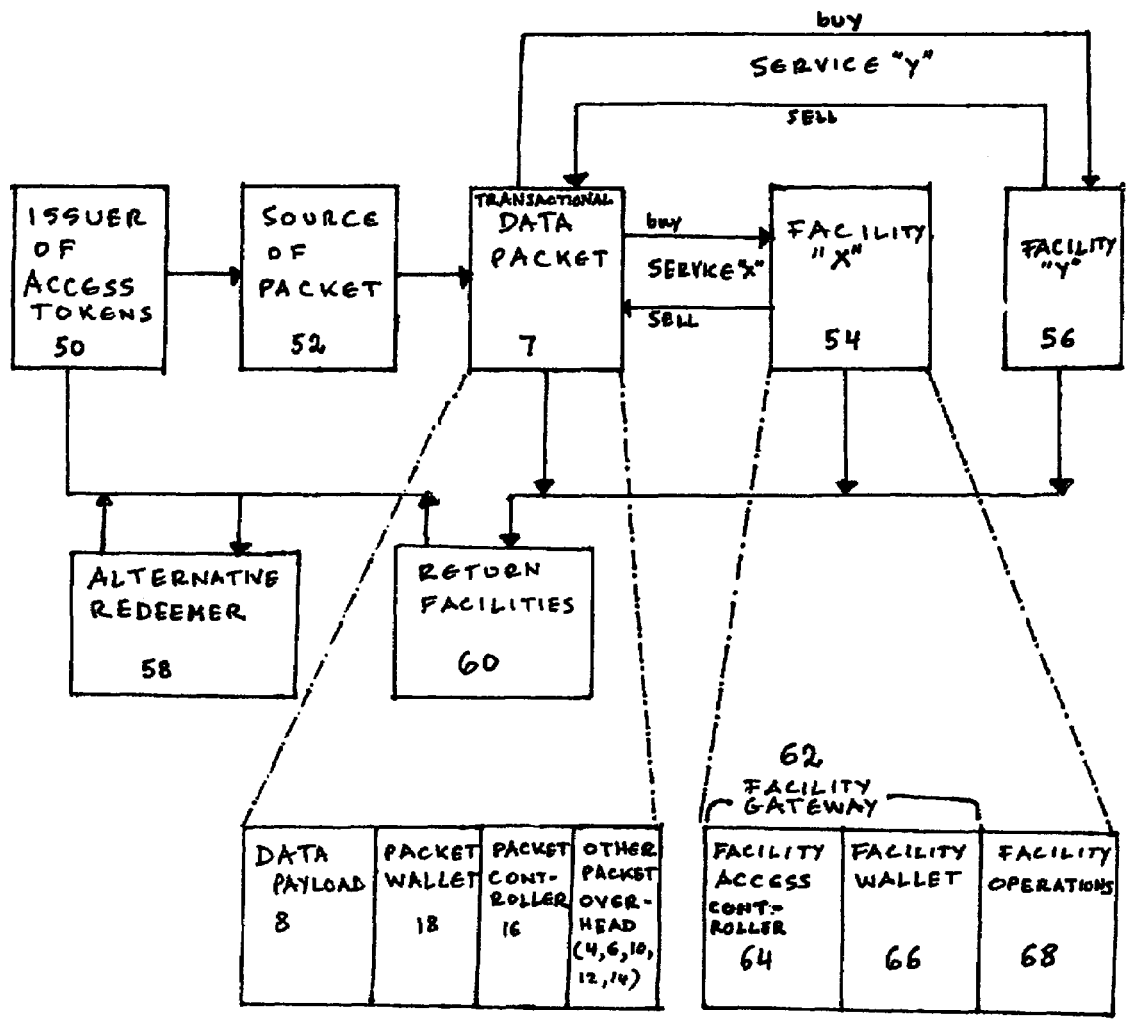
FIG. 2 is a flow diagram for access tokens, illustrating a full circle of an electronic payment coin from issuance over usage to redemption.

FIGS. 1 and 2

In a data packet known as a "transactional data packet" (7), a location (field) is assigned and defined as the "packet wallet" (18). This packet wallet contains information bits of an alphanumeric sequence which is called an "access token" (20). Such access tokens are transferable, and permit access to a facility (such as 54, 56, and 60) that requires them for access. A field might contain multiple tokens (such as 20 and 22), or tokens denominated at multiple units that can be drawn down like a debit card.

Access tokens (20) could include the address (32) of the issuer institution (50) that created it.

Another location in the transactional data packet (7) is set as the field for a "packet controller" (16), which is a software program that can engage in decision making regarding the payments (transfer) of the tokens. The packet controller (16) consists of several elements, among them a set of packet instructions (24), a packet communicator (26), and a packet authorizer (28) that conducts logical operations. The packet controller determines whether to engage in a transaction or to take an alternative, such as a transfer to another facility, based on programmed decision rules. The packet instructions and authorization would often be encrypted.

Another field in the transactional packets (7), the "convoy field" (14) could identify a set of other packets, designated "follower packets". Such follower packets would not include the packet wallet (18) and packet controller (16). When such information is provided in a transactional packet, such packet is known as a "transactional lead packet".

At various facilities (such as 54 and 56)—for example transmission segments, switches, processing or storage devices, office equipment, and consumer electronic devices—a "facility access gateway" (62) is provided. Such a gateway consists of a "facility access controller" (64), which is software that blocks and unblocks access to the facility in accordance to its decision rules. It communicates its price and availability to the packet communicator (26), which may authorize the packet wallet (18) to release access tokens (20) and to transfers them to the facility wallet (66). The facility wallet (66) is a software location that is part of the facility access gateway (62), and which stores the access tokens (20) transferred to it from the packet wallet (18).

The facility access controller may also be able to identify other information contained in the packet, such as the source address (4) of the sender and the destination address (6) of the recipient.

The packet instructions (24) could also contain instructions whether to return a transactional packet (7) containing access tokens, and to what destination. For such a return to redemption, it would travel without its data payload (8).

Facility gateways (62) send access tokens (20) from their wallets (66) for redemption to the issuer (50) of such tokens, or to alternative redeemers (58). To do so they load these access tokens on their own data packets, which make their way to the redeemers over return facilities (60) for which service they might have to transfer some of the access tokens. The redeeming institutions would issue a credit for the returned access tokens.

OPERATION OF INVENTION

FIGS. 1 and 2

Access tokens (20) are created by authorized issuer institutions (50) and bought by users ("source of packets" (52)) who add them, at a quantity and denomination based on their assessment of the transactions likely to be needed, to the transactional data packets which they send out. These users also provide the data payload, if any, other overhead and header information such as their address (4), the destination address (6), packet and convoy identifiers (12 and 14), and the set of packet instructions (24) that enable it to engage in transactions.

In order for transactional data packets (7) to be able to access facilities (54 and 56) operated by various other facility providers and obtain their facility operations (68), they would have to pass the facility access gateways (62) of such facility providers. These gateways would require the transfer (i.e. payment) of access tokens (20) from the packet wallet (18) to the facility wallet (66). Tokens can be used for many purposes, at many facilities. For example, facilities whose services are bought by the transactional packet, such as transmission providers, storage devices, encryption and conversion service providers, or providers of databases would require the transfer of access tokens from the transactional packet (7). Furthermore, the tokens could be used to buy or sell a variety of other goods and services, with the transactional packet functioning as an agent for transactions beyond its own passage and processing, based on the set of packet instructions (24) provided by the source of such packets (52).

The facility access controller (64) would engage in a transaction with the packet controller (16), which would release one or several access tokens from the packet wallet (18) and transfer them to the facility wallet (66), in order to gain access to the facility or engage in other transactions.

But it is also possible that the direction of payment is in the opposite direction, because the facility receives a service of benefit from the transactional packet or acquires other consideration. An example would be the audio recorder equipment facility of a consumer, to whom packets containing music are sent by a music distributor. In such a situation, the facility access controller (64) will transfer its own access tokens (20) to the packet wallet (18), as payment for the receipt of information of value.

These transactions, conducted on the packet level of information, are termed "nano" transactions.

However, the transaction amounts in question need not be small. The mechanism created—a collocation of a transaction intelligence software, a means of payment, and a vehicle in the form of a transactional data packet—permit applications that go beyond the treatment of the packet itself. It creates an intelligent agent program which carries its own means of payment, and is hence capable of negotiation and payment for any goods and services, such as payment for an item of merchandise it identifies as a desirable buy. Similarly, it can also be empowered to conduct a sale to other parties, and to collect payment from them.

The packets themselves are likely to be larger than they are today, to accommodate the additional fields, and in order to avoid the repetition of such overhead data as packet wallet (18) and packet controller (16). It is also possible for a transactional packet to function as a "lead transactional packet" for other packets that do not contain a packet wallet and packet controller. A lead packet would conduct the transaction, and pay for it through the transfer of access tokens, for a set of other "follower packets" designated by it on its "convoy field". This would enable the creation of convoys of packets moving near each other, similarly to virtual circuit packet networks. Transactional packets could operate for many different packet protocols and be compatible with many means of communication and equipment.

Facility access controllers can set access token requirements at a fixed rate, or they can change the required access price dynamically, depending on the available capacity, time of day, demand, etc. They could also set different access token requirements depending on the domain name type or identity of the sender as revealed in the source address (4), or destination address (6), or of a priority classification or service category provided by the packet.

The access tokens can be created by a variety of ways, including banks and intermediary institutions. Parts of the tokens can be encrypted to reduce the potential for forgery, and need not be decrypted by the users. Several types of access tokens are possible. They would be typically of very low denominations and sold in bulk by these institutions to facilities and users. There could be several basic denominations of tokens, just as in the case of coins, and/or tokens that could be drawn down, as in the case of pre-payment cards.

Packet controllers would have instructions whether to return transactional data packets containing access tokens (and without the data payload of the packet) to the issuer of the access token (50), to the original source of the packets (52), to an alternative redeemer (58), or to remain with the facility access gateway as credit for future transactions. (Note: not all of these alternatives are charted in FIG. 2 in order to reduce clutter.)

The facility gateways would periodically redeem their net balance of access tokens at the issuer of the access tokens (50) or alternative redeeming institutions (58).

The address identification (32) of the institution issuing the access tokens and their presentation for redemption, plus information on sender, recipients, and facilities, will assist in maintaining security against the forgery and duplication of access tokens.

The system and method of transactional data packets and facility access gateways enables the creation of transactions among packets and facilities. It enables prices to be set by facilities for their service, simple negotiations to take place between packets and facilities, payment to be transferred from the packets to facilities (and vice versa), packets to seek the optimal facilities for the service they require relative to its cost, according to their instructions. In other cases, where facilities may desire visits by those seeking information, such as advertising, promotional or commerce sites, the visiting packets could be paid in tokens by the facility for their visit. In other cases, such as that of certain personal information, the access to such information would be tied to payments by tokens to an individual's electronic wallet located at a facility. In other cases, where information is "pushed" to a recipient or facility, consuming that recipient's processing, transmission, and attention, it could be required to compensate the recipient through the transfer of tokens.

It is likely that certain new types of facilities would emerge, for example those offering escrow services for payments, those offering markets where packets could select those facilities whose rates or performance are most favorable to them, and those engaged in international transactions involving the access packets issued by institutions in various countries.

Similarly, the system of transactional data packets can be expanded into a more general system of intelligent agent programs carrying means of payment with them, and capable of collecting payments from those with which they transact. Such a system can be employed for a wide variety of economic transactions beyond informational activities.

These are but a few examples for applications that could emerge based on the method and system. The method enables a market system of prices, choices, and payments on the level of packets. It endows packets with greater decision autonomy and economic means to enable such autonomy. It thus creates money linked to processing intelligence, "smart money", as well as information that is linked to means of payment, "rich information". It does not require advance relationships between the transacting parties such as subscriptions or contracts.

The system also permits, through its ability to identify packets, the differential treatment of packets of different senders, recipients, and type of content. It therefore creates a fine tool for differentiated pricing and priority, and also for differential legal and regulatory treatment of various packets.

The above system and method has flexibility in the type of tokens, of which there could be several, and in such added features such that of the "lead packet', and of packet identification and differentiation. Many other features are possible, such as, for example, an access token's validity expiring after a certain time, interest be added to unspent tokens, or packet controllers requiring payment for a duplication of a packet. These are merely examples of the potential features and applications that become possible once the method of integrating strings of information with money and some processing intelligence is adopted.

CONCLUSION, RAMIFICATION, AND SCOPE OF INVENTION

Accordingly, the method described creates an efficient mechanism of payments and transactions on the level of packets for services that such packets require or provide to other parties. Such a system could have a major impact on all aspects of the information sector and of transactions in general.

Such a mechanism permits numerous applications, in the same way that markets evolve and services emerge once economic incentives are created. The immediate benefits would be for transactions in transmission, storage, processing, information access, and content provision, going far beyond computer communications. Numerous applications would no doubt emerge as payment for them becomes possible, and as the packets are enabled to flexibly engage in transactions.

Thus the scope of the invention should be determined by the appended claims and their legal equivalents, rather than by the examples given. It is to be understood that embodiments and variations described and provided herein are merely illustrative of the principles of the invention and that various modifications may be implemented by those skilled in the art without departing from the scope and spirit of the invention.

What is claimed is:

1. A method for creating and using autonomous transactions for dynamic and changing commercial transactions outside the direct control of senders and recipients for the payment of goods and services comprising:
   a) creating a string of digital signals known as a transactional data-packet, storable on a computer-readable medium, and transmittable through a network;
   b) creating a string of digital signals known as an access token, denominated at a certain value, and storable individually or together with other said access tokens as part of said transactional data packet in a dedicated field known as a packet wallet;
   c) creating a software program known as a facility access gateway configured to interact with said transactional data-packet with resultant transactions transferring to or receiving from said packet wallet said access tokens which said transactional data-packets carry, said facility access gateways being located at the facilities and equipment of users as well as of providers of various services involving information and being storable on a computer-readable medium;
   d) creating a software control program known as a packet controller, similarly storable as part of said transactional data-packet, and which controls the release or admission of said access tokens from or to said transactional data packet, with said packet controller programmable by the issuer of said transactional data-packets and storable on a computer readable storage medium on a dedicated field of said transactional data-packet known as a packet controller field, with said packet controller containing:
      a. a field which may list other identified packets
      b. a software decision element which accepts or rejects the said price listed by said facility access gateway for the service it is offering or seeking
   e) placing, by a sender of said transactional data-packet, said access tokens, after being acquired from an issuer of said tokens, in the said packet wallet of said transactional data-packet, together with other instructions, and sending them to a specified recipient, or a recipient class, or to roam networks with a specified task;
   f) engaging said transactional data-packets, controlled by its said packet controller, in a transaction with said facilities access gateways of a service provider, including a transmission network or other party, transferring said access tokens in full or part at the facility access gateway of a service provider in return for access to the facility and its services by said transactional data-packet or of other packets listed in its packet controller, or in return for services including storage or transmission or other transactions and exchanges;
   g) enabling the terms of a rejected price offer from the facility access gateway to be modified by the said facility access gateway, thereby enabling a variable pricing that varies dependent on the circumstances including congestion and demand conditions;
   h) transferring one or several said access tokens from the facility wallet to said packet wallet in return for the service which said transactional data-packet and other packets listed by it provides to the facility, or in return for other consideration;
   i) returning of said transactional data-packet, with said access tokens in the said packet wallet, to the sender or a designated third party; and
   j) enabling the re-use of said access tokens by the sender, or by the owners of said facility wallets, in subsequent transactions.

2. The method of claim 1, further comprising:
   a) a field known as the convoy information field on a transactional data-packet-known as the master packet, identifying other transactional data-packets as its follower packets, in whose behalf it conducts transactions with facilities, said field being storable and machine readable; and
   b) a stored software program as part of the said facility access controller reading the source and destination addresses and other fields of said master packet and said follower packets, and establishing access conditions for said follower packets based on the information contained in said convoy information field, facilitating a single master transaction instead of repetitive identical transactions.

3. The method of claim 2 further comprising:
   a) said transactional data-packet divided into several shorter transactional data sub-packets each carrying a particular subsection of the information contained in said transitional data-packet, storable and machine readable on the storage, and associated with each other through identification in the said convoy information fields contained in each of the said transactional data sub-packets for the purpose of enabling long transactional data-packets to be broken up into several shorter data packets; and
   b) a software program as part of said facilities controller which assembles the transaction data sub-packets identified as part of the same divided transactional data-packet, into a full transaction data packet, and by stripping it of repetitive packet overhead information, said assembly for purpose of enabling a transaction between said transactional-data packet and said facility controller.

4. The method of claim 3 further comprising:
additional software located at the packet controller as part of the said transactional data-packet, storable on the machine-readable storage media, and capable of interaction with said facility access gateways, enabling said transactional data-packets to engage in additional types of performances and applications.

5. The method of claim 4 further comprising:
   a) said facility access gateways capable of being located at a distance from the actual facility, and stored on a computer-readable medium; and
   b) transactional data-packets whose said packet controllers can interact with each other, thus enabling them to transact while remote from facilities and creating markets serving multiple participants.

* * * * *